US006322099B1

United States Patent
Keeble

(10) Patent No.: US 6,322,099 B1
(45) Date of Patent: Nov. 27, 2001

(54) DEVICE FOR DEFLATING AND RESTRAINING INADVERTENTLY DEPLOYED VEHICLE AIRBAG

(76) Inventor: Timothy E. Keeble, 427 Dairy La., Lenoir City, TN (US) 37772

( * ) Notice: Subject to any disclaimer, the term of this patent is extended or adjusted under 35 U.S.C. 154(b) by 0 days.

(21) Appl. No.: 09/607,664

(22) Filed: Jun. 30, 2000

(51) Int. Cl.[7] .................................................. B60R 21/00
(52) U.S. Cl. .......................................... 280/727; 280/750
(58) Field of Search .................................. 280/727, 750; 74/558

(56) References Cited

U.S. PATENT DOCUMENTS

| 5,277,440 | 1/1994 | Jackson, Jr. | 280/727 |
| 5,911,435 | 6/1999 | Sablan, Sr. | 280/731 |
| 5,997,028 | 12/1999 | Lenz | 280/727 |
| 6,203,055 | * 3/2001 | Mouws | 280/727 |

OTHER PUBLICATIONS

Public Safety Product News, Bagbuster™, http://www.bagbuster.com.

* cited by examiner

Primary Examiner—Eric Culbreth
Assistant Examiner—L. Lum
(74) Attorney, Agent, or Firm—Pitts & Brittian, P.C.

(57) ABSTRACT

A safety device for restraining and deflating an airbag. The safety device 10 is intended to be used by rescue personnel at vehicle accident scenes to prevent the risk of injury to rescue personnel and/or an accident victim from an inadvertent deployment of a vehicle's driver's side self-inflating restraint, commonly referred to, and referred to herein, as an airbag. The safety device 10 is securable to a conventional steering wheel 12 and provides a rigid barrier between the steering wheel 12 and a rescuer or accident victim. The safety device 10 includes a rigid, shield member 15, having a front 17 side and a back side 18. At least one cutting member 20 for rupturing the airbag upon deployment is disposed on the back side 18 of the shield member 15. A cage member 30 depends from the back side 18 of the shield member 15 and receives a first portion 32 of the steering wheel 12. The cage member 30 cooperates with a locking member 50, and is in spaced relation from the locking member 50 which receives a second portion of the steering wheel 12, in order to fix the safety device 10 to the steering wheel 12 in a positive locking manner.

20 Claims, 3 Drawing Sheets

DEVICE FOR DEFLATING AND RESTRAINING INADVERTENTLY DEPLOYED VEHICLE AIRBAG

CROSS-REFERENCE TO RELATED APPLICATIONS

Not Applicable

STATEMENT REGARDING FEDERALLY SPONSORED RESEARCH OR DEVELOPMENT

Not Applicable

BACKGROUND OF THE INVENTION

1. Field of Invention

This invention relates to a safety device for protecting rescue personnel at a vehicle accident site from being injured by an inadvertently deployed airbag. More particularly, it relates to a device for deflating and restraining an inadvertently deployed vehicle airbag.

2. Description of the Related Art

Self-inflating passenger restraints, commonly referred to as airbags are readily known in the art for use in protecting passengers of automobiles during frontal impact collisions. However, it is also known that, on occasion, an airbag will not deploy upon impact. And, an inadvertent, uncontrolled deployment of such an airbag during a rescue operation to remove an injured, or pinned, person from the vehicle poses a serious risk of injuring either the accident victim, the rescuer or both. As a result of the risk of this type of injury, various safety devices for restricting uncontrolled driver's side airbag deployment are known in the art. Typical of these devices are those disclosed in the following U.S. Letter Patents:

| U.S. Pat. No. | Inventor Name | Issue Date |
|---|---|---|
| 5,277,440 | Jackson, Jr. | Jan. 11, 1994 |
| 5,911,435 | Sablan, Sr. | Jun. 15, 1999 |
| 5,997,028 | Lenz | Dec. 7, 1999 |

What is missing in the art is a safety device that can be affixed to any of the various sized automotive steering wheels presently marketed, that restrains and deflates an inadvertently deployed airbag, and that can be securely locked onto the steering wheel so as to prevent the safety device from being dislodged from the steering wheel.

It is therefore an object of the present invention to provide a device for deflating and restraining an inadvertently deployed vehicle airbag that readily engages conventionally sized automobile steering wheels.

Another object of the present of the present invention is to provide a device that is securable to an automobile steering wheel in a manner that substantially reduces the possibility of the device from becoming dislodged from the steering wheel.

Other objects and advantages over the prior art will become apparent to those skilled in the art upon reading the detailed description together with the drawings as described as follows.

BRIEF SUMMARY OF THE INVENTION

In accordance with the teachings of the present invention a safety device for protecting rescue personnel, and/or accident victims, at a vehicle accident site from being injured by an inadvertently deployed airbag is provided. The safety device of the present invention is securable to a conventional steering wheel and provides a rigid barrier between the steering wheel and a rescuer or accident victim. The safety device restrains and deflates an inadvertently deployed vehicle airbag. In this regard, the safety device includes a rigid, shield member for restraining an inadvertently deployed airbag. At least one, and preferably a plurality of cutting members are disposed on a back side of the shield member for puncturing and deflating the airbag as it inflates. Further, brace members are disposed in spaced relation to one another on the back the shield member. A receptor cage member receives a portion of a steering wheel and cooperates with a locking device to fix the safety device to the steering wheel. In the preferred embodiment, the lock is defined by at least two extensions in close proximity to one another that are spaced apart so as to receive a second portion of the steering wheel there between. The extensions are adapted to receive a securement member that locks the second portion of the steering wheel in place within the space defined by the extensions.

BRIEF DESCRIPTION OF THE SEVERAL VIEWS OF THE DRAWINGS

The above-mentioned features of the invention will become more clearly understood from the following detailed description of the invention read together with the drawings in which.

DETAILED DESCRIPTION OF THE INVENTION

Figure 1:
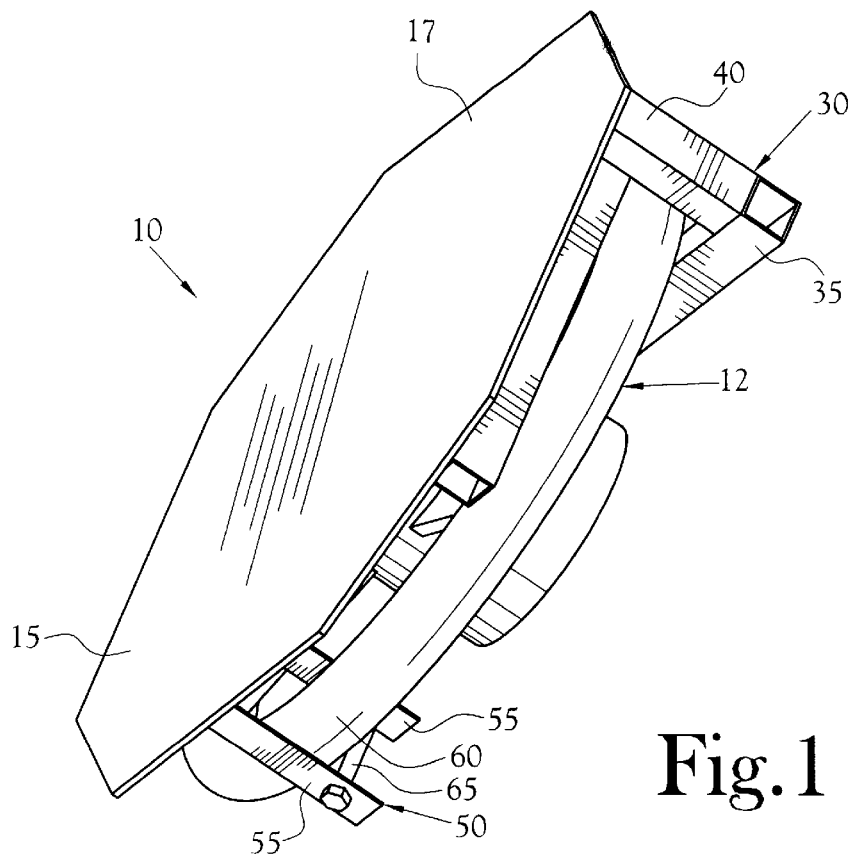
FIG. 1 is a perspective view of the safety device of the present invention, showing the safety device mounted and locked onto a conventional steering wheel.
Figure 2:
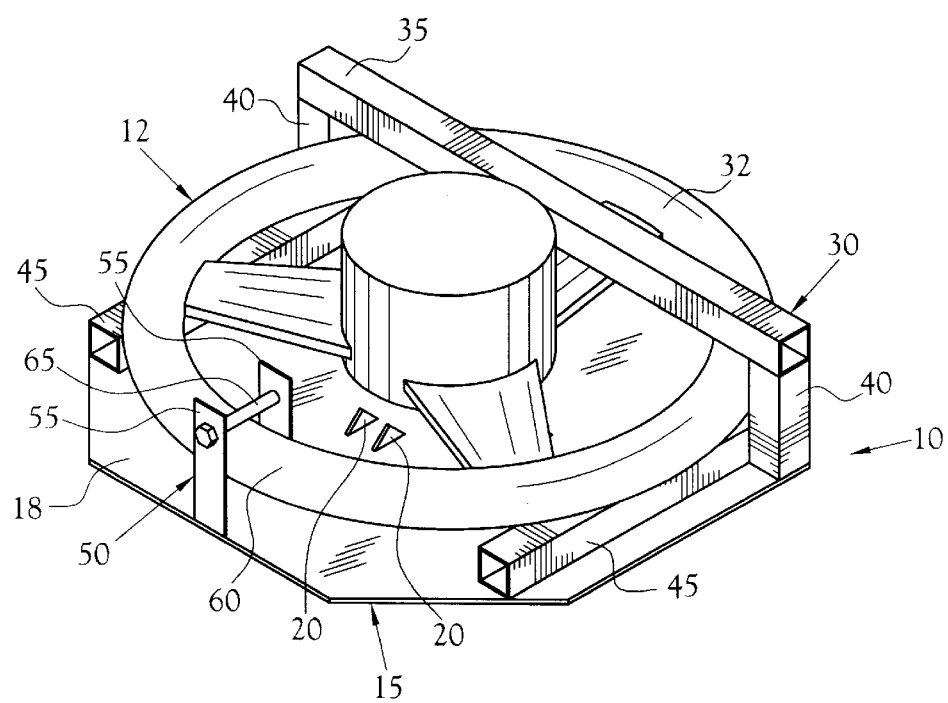
FIG. 2 is a rearward perspective view of the safety device shown in FIG. 1.
Figure 3:
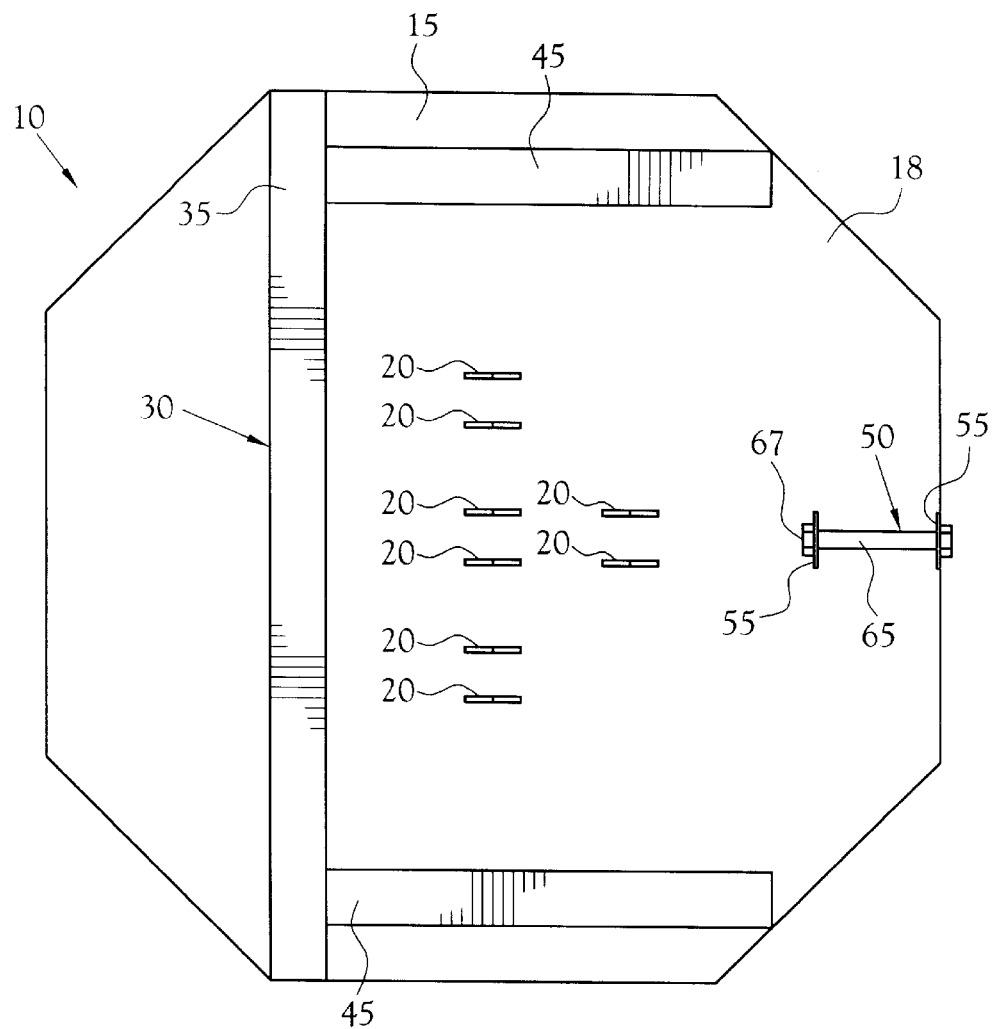
FIG. 3 is a bottom plan view of the safety device illustrated in FIG. 1.
Figure 4:
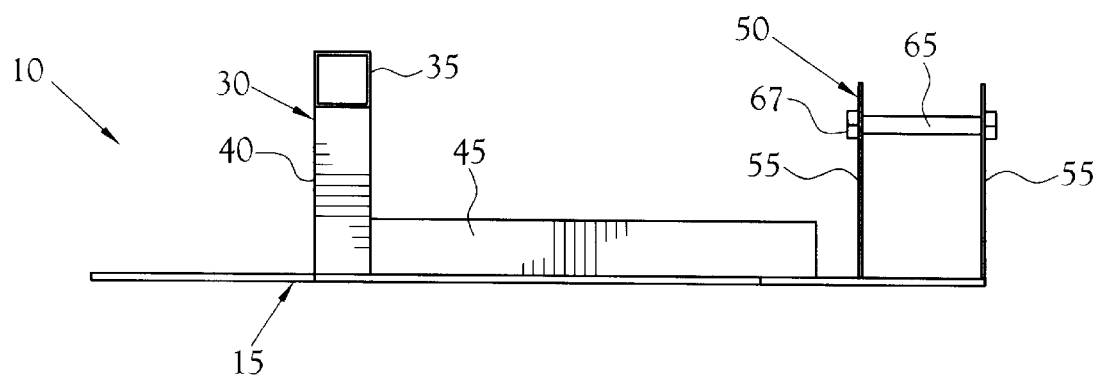
FIG. 4 is a side elevation view of the safety device illustrated in FIG. 1.

A safety device for restraining and deflating an airbag, constructed in accordance with the present invention, is illustrated generally as 10 in the figures. The safety device 10 is intended to be used by rescue personnel at vehicle accident scenes to prevent the risk of injury to rescue personnel and/or an accident victim from an inadvertent deployment of a vehicle's driver's side self-inflating restraint, commonly referred to, and referred to herein, as an airbag.

In accordance with the teachings of the present invention, the safety device 10 is securable to a conventional steering wheel 12 and provides a rigid barrier between the steering wheel 12 and a rescuer or accident victim (neither shown). The safety device 10 restrains and deflates an inadvertently deployed vehicle airbag. In this regard, the safety device 10 includes a rigid, shield member 15, having a front 17 side and a back side 18. It will be understood that reference to the front side 17 refers to the side that faces away from the steering wheel 12 when the safety device 10 is secured to the steering wheel 12, while reference to the back side 18 refers to the side that faces the steering wheel when the safety device 10 is secured to the steering wheel 12. The shield member 15 is sized to substantially cover the steering wheel 12. In the preferred embodiment, the shield member is substantially planar. However, it will be appreciated that the shield member 15 could be contoured. The shield member 15 serves as a barrier for restraining an inadvertently deployed airbag from extending beyond the safety device 10 into the portion of the passenger compartment that is occupied by an accident victim and potentially rescue personnel.

In order to puncture, and thereby quickly exhaust, the inflating airbag, at least one, and preferably a plurality of cutting members 20 are disposed on the back side 18 of the shield member 15. While cutting members 20 are illustrated as having a substantially triangular silhouette, those skilled in the art will recognize that the cutting members 20 could have any silhouette adapted to puncture and/or slice the inflating airbag.

Figure 5:
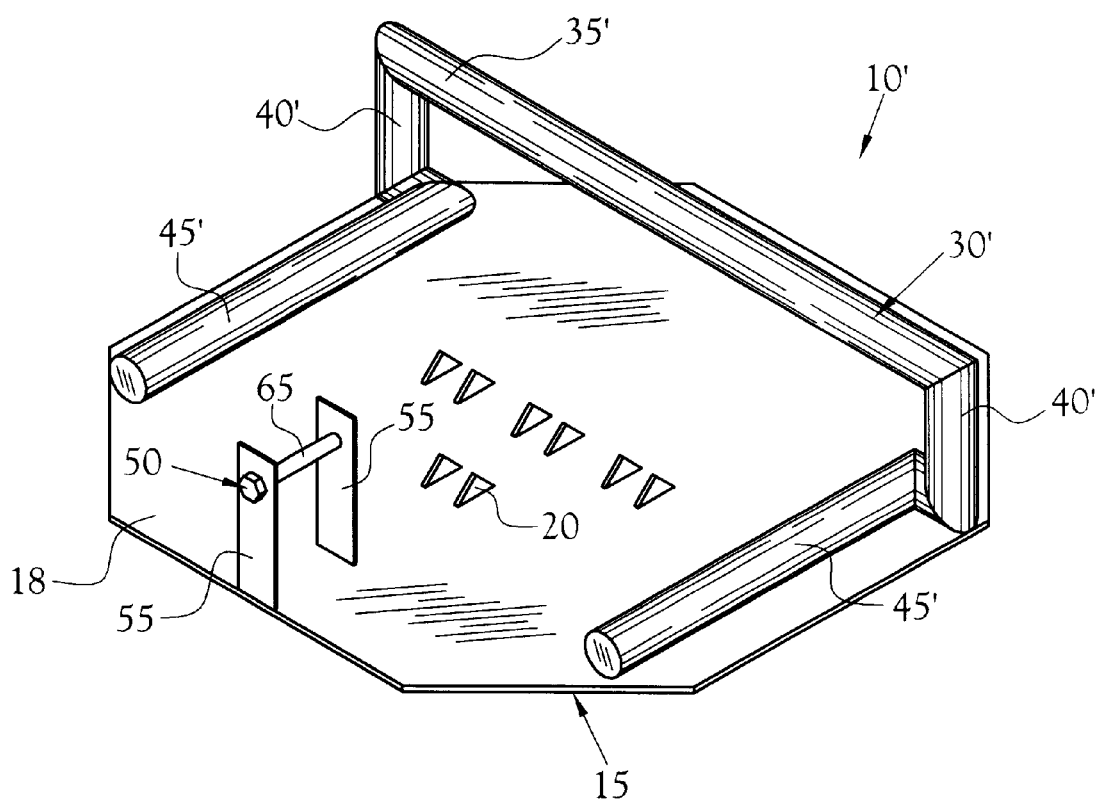
FIG. 5 is a rearward perspective view of an alternate embodiment of the safety device of the present invention.

A cage member 30, defining a steering wheel receptor, depends from the back side 18 of the shield member 15 and receives a first portion 32 of the steering wheel 12. In the preferred embodiment, the cage member 30 is defined by an elongated cross bar 35 that is supported in spaced relation from the shield member 15 by leg members 40 that depend from the shield member 15. In the preferred embodiment, the leg members 40 are substantially perpendicular to the shield member 15. In order to support the safety device 10 against the steering wheel, and also to allow a space between the shield member 15 and the steering wheel 12 in which to accommodate the cutting members 20, at least one, and preferably two brace members 45 are disposed in spaced relation to one another on the back side 18 of the shield member 15. In the preferred embodiment, the cross bar 35, the leg members 40, and the brace members 45 are defined by square tubing and the cross bar 35 is secured to the leg members 40 as by welding. However, the cross bar 35, the leg members 40 and the brace members 45 could be integral. Moreover, as illustrated in FIG. 5, in an alternate embodiment, the cross bar 35', leg members 40' and the brace members 45 are integral and are cylindrical in cross section. Further, while the individual components described above could be securely affixed to the shield member 15, as by welding, it will be appreciated that the safety device could be unitary and cast or machined.

The cage member 30 cooperates with a locking member 50, and is in spaced relation from the locking member 50 in order to fix the safety device 10 to the steering wheel 12 in a positive locking manner. In the preferred embodiment, the locking member 50 is defined by at least two extensions 55 that depend from the back side of the shield member 15. The extensions 55 are disposed in close proximity to one another and are spaced apart so as to receive a second portion 60 of the steering wheel 12 there between. The extensions are adapted to receive a securement member 65 that locks the second portion 60 of the steering wheel 12 in place within the space defined by the extensions 55. In the preferred embodiment, the securement member 65 is a bolt that is secured with a threaded nut 67. The locking member 50 in conjunction with the securement member 65 positively locks the safety device 10 onto the steering wheel 12 so as to prevent the safety device 10 from being dislodged from the steering wheel. In the preferred embodiment, the safety device 10 is constructed of carbon steel. However, those skilled in the art will recognize that other high strength, impact resistant materials, such as aluminum, or high strength composite materials could also be utilized.

From the foregoing description, it will be recognized by those skilled in the art that a safety device to be used for rescue personnel at the scene of an automobile accident for preventing an inadvertently deployed airbag from injuring rescue personnel and/or an accident victim by deflating and restraining the airbag. Specifically, the present invention provides a safety device that readily engages conventionally sized automobile steering wheels, that is securable to an automobile steering wheel in a manner that substantially reduces the possibility of the device from becoming dislodged from the steering wheel and that deflates and restrains the airbag upon an inadvertent deployment.

While a preferred embodiment has been shown and described, it will be understood that it is not intended to limit the disclosure, but rather it is intended to cover all modifications and alternate methods falling within the spirit and the scope of the invention as defined in the appended claims.

Having thus described the aforementioned invention, I claim:

1. A safety device for mounting on an automobile steering wheel for preventing injury caused by inadvertent deployment of an airbag, said safety device comprising:
   a rigid, shield member, having a front side and a back side;
   at least one cutting member carried by said back side of said shield member;
   a cage member defining a steering wheel receptor depending from said back side of said shield member and receives a first portion of the steering wheel;
   at least one brace member disposed on the back side of the shield member; and
   a locking member carried by said shield member for receiving a second portion of the steering wheel and for fixing said safety device to the steering wheel in a positive locking manner, wherein said locking member cooperates with said cage member and is in spaced relation from said cage member.

2. The safety device of claim 1 wherein said shield member is sized to substantially cover a conventional steering wheel.

3. The safety device of claim 1 wherein said shield member is substantially planar.

4. The safety device of claim 1 wherein said safety device comprises a plurality of said cutting members carried by said back side of said shield member.

5. The safety device of claim 1 wherein said cutting members have a substantially triangular silhouette.

6. The safety device of claim 1 wherein said cage member is defined by an elongated cross bar supported in spaced relation from said shield member by leg members depending from said shield member.

7. The safety device of claim 6 wherein said leg members are substantially perpendicular to said shield member.

8. The safety device of claim 6 wherein said elongated cross bar, said leg members, and said brace member are constructed of square tubing and said cross bar is secured to said leg members as by welding.

9. The safety device of claim 6 wherein said cross bar, said leg members and said brace member are integral.

10. The safety device of claim 6 wherein said cross bar, said leg members and said brace member are cylindrical in cross section.

11. The safety device of claim 1 wherein said locking member is defined by at least two extensions that depend from said back side of said shield member, wherein said extensions are adapted to receive a securement member, and further wherein said extensions are disposed in close proximity to one another and are spaced apart so as to receive the second portion of the steering wheel there between, said securement member being adapted for locking the second portion of the steering wheel in a positive locking manner within the space defined by the extensions.

12. The safety device of claim 11 wherein said securement member is a bolt that is secured with a threaded nut.

13. A safety device for mounting on an automobile steering wheel for preventing injury caused by inadvertent deployment of an airbag, said safety device comprising:
- a rigid, shield member, having a front side and a back side;
- a plurality of cutting members carried by said back side of said shield member;
- a cage member defining a steering wheel receptor depending from said back side of said shield member and receives a first portion of the steering wheel, wherein said cage member is defined by an elongated cross bar supported in spaced relation from said shield member by leg members depending from said shield member;
- at least a pair of brace members disposed in spaced relation to one another on the back side of the shield member; and
- a locking member carried by said shield member for receiving a second portion of the steering wheel and for fixing said safety device to the steering wheel in a positive locking manner, wherein said locking member cooperates with said cage member and is in spaced relation from said cage member.

14. The safety device of claim 13 wherein said shield member is substantially planar.

15. The safety device of claim 13 wherein said leg members are substantially perpendicular to said shield member.

16. The safety device of claim 13 wherein said elongated cross bar, said leg members, and said brace members are constructed of square tubing and said cross bar is secured to said leg members as by welding.

17. The safety device of claim 13 wherein said cross bar, said leg members and said brace members are integral.

18. The safety device of claim 13 wherein said cross bar, said leg members and said brace members are cylindrical in cross section.

19. The safety device of claim 13 wherein said locking member is defined by at least two extensions that depend from said back side of said shield member, wherein said extensions are adapted to receive a securement member, and further wherein said extensions are disposed in close proximity to one another and are spaced apart so as to receive the second portion of the steering wheel there between, said securement member being adapted for locking the second portion of the steering wheel in a positive locking manner within the space defined by the extensions.

20. The safety device of claim 19 wherein said securement member is a bolt that is secured with a threaded nut.

* * * * *